(12) United States Patent
Sun et al.

(10) Patent No.: US 9,384,537 B2
(45) Date of Patent: Jul. 5, 2016

(54) VIRTUAL SPATIAL OVERLAP MODULATION MICROSCOPY FOR RESOLUTION IMPROVEMENT

(71) Applicant: NATIONAL TAIWAN UNIVERSITY, Taipei (TW)

(72) Inventors: Chi-Kuang Sun, New Taipei (TW); Wei-Cheng Kuo, New Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 54 days.

(21) Appl. No.: 14/474,167

(22) Filed: Aug. 31, 2014

(65) Prior Publication Data

US 2016/0063689 A1    Mar. 3, 2016

(51) Int. Cl.
*G06K 9/00*     (2006.01)
*G06T 5/20*     (2006.01)
*G06T 5/00*     (2006.01)

(52) U.S. Cl.
CPC . *G06T 5/20* (2013.01); *G06T 5/008* (2013.01); *G06T 2207/10056* (2013.01); *G06T 2207/30088* (2013.01)

(58) Field of Classification Search
USPC .................................................. 382/128, 254
See application file for complete search history.

(56) References Cited

U.S. PATENT DOCUMENTS

| | | | | | |
|---|---|---|---|---|---|
| 5,459,520 | A | * | 10/1995 | Sasaki | H04N 7/0102 348/222.1 |
| 6,192,150 | B1 | * | 2/2001 | Leow | G06F 17/30262 382/181 |
| 2001/0048764 | A1 | * | 12/2001 | Betrisey | G09G 5/005 382/162 |
| 2002/0113202 | A1 | * | 8/2002 | Falk | G02B 21/008 250/234 |
| 2002/0199164 | A1 | * | 12/2002 | Sengupta | G06K 9/32 382/278 |
| 2009/0067509 | A1 | * | 3/2009 | Poon | G09G 3/3648 375/240.26 |
| 2009/0294694 | A1 | * | 12/2009 | Lippert | G01N 21/6458 250/461.1 |
| 2010/0086215 | A1 | * | 4/2010 | Bartlett | G06K 9/00335 382/197 |
| 2010/0098345 | A1 | * | 4/2010 | Andersson | H04N 19/85 382/238 |
| 2010/0150472 | A1 | * | 6/2010 | Chen | G02B 21/008 382/278 |
| 2012/0045108 | A1 | * | 2/2012 | Shechter | G06T 11/005 382/131 |
| 2013/0058567 | A1 | * | 3/2013 | Mallat | G06K 9/527 382/159 |
| 2014/0118499 | A1 | * | 5/2014 | Shibata | G06T 5/002 348/46 |

OTHER PUBLICATIONS

Isobe et al., Implementation of spatial overlap modulation nonlinear optical microscopy using an electro-optic deflector, Biomedical optics express, vol. 4, issue 10, 2013.*
Photoshop help/Filter basics, Apr. 12, 2014, pp. 1-4.*
Wen-Jeng Lee, et al., "Virtual biopsy of rat tympanic membrane using higher harmonic generation microscopy", Journal of Biomedical Optics, Jul.-Aug. 2010, pp. 046012-1-046012-5, vol. 15(4), SPIE., US.
Chieh-Feng Chang, et al., "Multi-photon resonance enhancement of third harmonic generation in human oxyhemoglobin and deoxyhemoglobin", Journal of Biophotonics, 2010, pp. 678-685, vol. 3(10-11), Wiley-VCH UK.

(Continued)

*Primary Examiner* — John Strege
(74) *Attorney, Agent, or Firm* — ScienBiziP, P.C.

(57) ABSTRACT

A method and non-transitory computer readable medium for processing an oversampled image is disclosed. Filters are applied to an oversampled image to obtain a filtered image. The image filters are Gabor filter, cosine filter, laplacian of Gaussian filter, and radial filter. The filtered image can be turned into a displayed image that is displayed. The displayed image can be a 3D image. The displayed image can be refreshed at a rate of about one frame per second.

33 Claims, 8 Drawing Sheets

(56) References Cited

OTHER PUBLICATIONS

Shih-Hsuan Chia, et al., "A sub-100fs self-starting Cr:forsterite laser generating 1.4W output power", Optics Express, Nov. 8, 2010, pp. 24085-24091, vol. 18(23), OSA., US.
Yu-Wei Chiu, et al., "Applying Harmonic Optical Microscopy for Spatial Alignment of Atrial Collagen Fibers", PloS one, Nov. 2010, pp. e13917-1-e13917-9, vol. 5(11), Public Library of Science, US.
Ming-Rung Tsai, et al., "In vivo optical virtual biopsy of human oral mucosa with harmonic generation microscopy", Biomedical Optics Express, Aug. 1, 2011, pp. 2317-2328, vol. 2(8), OSA., US.
Ming-Rung Tsai, et al., "Characterization of oral squamous cell carcinoma based on higher-harmonic generation microscopy", Journal of Biophotonics, Mar. 2012, pp. 415-424, vol. 5(5-6), Wiley VCH, UK.
Jyh-Hong Lee, et al., "Evaluation of the role of CD207 on Langerhans cells in a murine model of atopic dermatitis by in situ imaging using Cr:forsterite laser-based multimodality nonlinear microscopy", Journal of Biomedical Optics, Nov. 2012, pp. 116007-1 to 116007-12, vol. 17(11), SPIE., US.
Yi-Hua Liao, et al., "Determination of chronological aging parameters in epidermal keratinocytes by in vivo harmonic generation microscopy", Biomedical Optics Express, Dec. 13, 2013, pp. 77-88, vol. 4(1), OSA, US.
Ming-Rung Tsai, et al., "Applying tattoo dye as a third-harmonic generation contrast agent for in vivo optical virtual biopsy of human skin", Journal of Biomedical Optics, Feb. 2013, pp. 26012-1-26012-5, vol. 18(2), SPIE., US.
Gwo Giun (Chris) Lee, et al., "Automatic cell segmentation and nuclear-to-cytoplasmic ratio analysis for third harmonic generated microscopy medical images", IEEE Transactions on Biomedical Circuits and Systems, Apr. 2013, pp. 158-168, vol. 7(2), CAS., US.
Wei-Cheng Kuo, et al., "Virtual spatial overlap modulation microscopy for resolution improvement", Optics Express, Dec. 2, 2013, pp. 30007-30018, vol. 21(24), OSA., US.
Szu-Yu Chen, et al.,"Noninvasive harmonics optical microscopy for long-term observation of embryonic nervous system development in vivo", Journal of Biomedical Optics, Sep.-Oct. 2006, pp. 054022-1-054022-8, vol. 11(5), SPIE., US.
Che-Hang Yu, et al.,"In vivo and ex vivo imaging of intra-tissue elastic fibers using third-harmonic-generation microscopy", Optics Express, Sep. 3, 2007, pp. 11167-11177, vol. 15(18), OSA., US.
Shi-Wei Chu, et al.,"Thickness dependence of optical second harmonic generation in collagen fibrils", Optics Express, Sep. 17, 2007, pp. 12005-12010, vol. 15(19), OSA., US.
Shi-Wei Chu, et al.,"Selective imaging in second-harmonic-generation microscopy by polarization manipulation", Applied Physics Letters, Sep. 7, 2007, pp. 103903-1-103903-3, vol. 91, AIP., US.
Shih-Peng Tai, et al.,"Molecular Imaging of Cancer Cells Using Plasmon-Resonant-Enhanced Third-Harmonic-Generation in Silver Nanoparticles", Advanced Materials, 2007, pp. 4520-4523, vol. 19, Wiley-VCH, Germany.
D.-B. Shieh, et al.,"Higher harmonic geneation and optoacoustic imaging for oral diagnosis", Oral Oncology, 2007, pp. 193-194, vol. 2(1), Elsevier, England.
Che-Hang Yu, et al.,"Molecular third-harmonic-generation microscopy through resonance enhancement with absorbing dye", Optics Letters, Feb. 15, 2008, pp. 387-389, vol. 33(4), OSA., US.
Tzu-Ming Liu, et al.,"Imaging polyhedral inclusion bodies of nuclear polyhedrosis viruses with second harmonic generation microscopy", Optics Express, Apr. 14, 2008, pp. 5602-5608, vol. 16(8), OSA., US.
Chieh-Feng Chang, et al., "Cell tracking and detection of molecular expression in live cells using lipid-enclosed CdSe quantum dots as contrast agents for epi-third harmonic generation microscopy", Optics Express, Jun. 23, 2008, pp. 9534-9548, vol. 16(13), OSA., US.
Cho-Shuen Hsieh, et al.,"Higher harmonic generation microscopy of in vitro cultured mammal oocytes and embryos", Optics Express, Jul. 21, 2008, pp. 11574-11588, vol. 16(15), OSA., US.
Szu-Yu Chen, et al., "Epi-third and second harmonic generation microscopic imaging of abnormal enamel", Optics Express, Jul. 21, 2008, pp. 11670-11679, vol. 16(15), OSA., US.

Ming-Che Chan, et al., "Cr:Forsterite-Laser-Based Fiber-Optic Nonlinear Endoscope With Higher Efficiencies", Microscopy Research and Technique, Aug. 2008, pp. 559-563, vol. 71(8), Wiley-Liss, US.
Cho-Shuen Hsieh, et al., "In vivo long-term continuous observation of gene expression in zebrafish embryo nerve systems by using harmonic generation microscopy and morphant technology", Journal of Biomedical Optics, Nov.-Dec. 2008, pp. 064041-1-064041-7, vol. 13(6), SPIE., US.
Shi-Wei Chu, et al., "Selective imaging in second-harmonic-generation microscopy with anisotropic radiation", Journal of Biomedical Optics Letters, Jan.-Feb. 2009, pp. 010504-1-010504-3, vol. 14(1), SPIE., US.
Jyh-Hong Lee, et al., "Noninvasive in vitro and in vivo assessment of epidermal hyperkeratosis and dermal fibrosis in atopic dermatitis", Journal of Biomedical Optics, Jan.-Feb. 2009, pp. 014008-1 to 014008-15, vol. 14(1), SPIE., US.
Szu-Yu Chen, et al., "Infrared-based third and second harmonic generation imaging of cornea", Journal of Biomedical Optics, Jul.-Aug. 2009, pp. 044012-1-044012-7, vol. 14(4), SPIE., US.
Szu-Yu Chen, et al., "In vivo harmonic generation biopsy of human skin", Journal of Biomedical Optics, Nov.-Dec. 2009, pp. 060505-1-060505-3, vol. 14(6), SPIE., US.
Chieh-Feng Chang, et al., "Direct backward third-harmonic generation in nanostructures", Optics Express, Mar. 29, 2010, pp. 7397-7406, vol. 18(7), OSA., US.
Ming-Rung Tsai, et al., "Second-harmonic generation imaging of collagen fibers in myocardium for atrial fibrillation diagnosis", Journal of Biomedical Optics, Mar.-Apr. 2010, pp. 026002-1-026002-6, vol. 15(2), SPIE., US.
Szu-Yu Chen, et al., "In Vivo Virtual Biopsy of Human Skin by Using Noninvasive Higher Harmonic Generation Microscopy", IEEE Journal of Selected Topics in Quantum Electronics, 2009 pp. 478 to 492, vol. 16(3), IPS, IEEE Photonics Society, US.
Shih-Hsuan Chia, et al., "Miniaturized video-rate epi-third-harmonic-generation fiber-microscope", Optics Express, Aug. 2, 2010, pp. 17382-17391, vol. 18(16), OSA., US.
Shi-Wei Chu, et al., "In vivo developmental biology study using noninvasive multi-harmonic generation microscopy", Optics Express, Nov. 17, 2003, pp. 3093-3099, vol. 11(23), OSA., US.
Chi-Kuang Sun, et al., "Multiharmonic-generation biopsy of skin", Optics Letters,Dec. 15, 2003, pp. 2488-2490, vol. 28(24), OSA., US.
Chi-Kuang Sun, et al., "Higher harmonic generation microscopy for developmental biology", Journal of Structural Biology, Jul. 2004, pp. 19-30, vol. 147(1), Elsevier, US.
Shi-Wei Chu, et al., "Studies of $\chi(2)/\chi(3)$ Tensors in Submicron-Scaled Bio-Tissues by Polarization Harmonics Optical Microscopy", Biophysical journal, Jun. 2004, pp. 3914-3922, vol. 86(6), Cambridge, MA : Cell Press, US.
Shih-Peng Tai, et al., "Two-photon fluorescence microscope with a hollow-core photonic crystal fiber", Optics Express, Dec. 13, 2004, pp. 6122-6128, vol. 12(25), OSA., US.
Shi-Wei Chu, et al., "High-Resolution Simultaneous Three-Photon Fluorescence and Third-Harmonic-Generation Microscopy", Microscopy Research and Technique, Mar. 1, 2005, pp. 193-197, vol. 66(4), Wiley-Liss, US.
Ming-Che Chan, et al., "Compact fiber-delivered Cr:forsterite laser for nonlinear light microscopy", Journal of Biomedical Optics, Sep.-Oct. 2005, pp. 054006-1-054006-4, vol. 10(5), SPIE., US.
Shi-Wei Chu, et al., "Simultaneous four-photon luminescence, third-harmonic generation, and second-harmonic generation microscopy of GaN", Optics Letters, Sep. 15, 2005, pp. 2463-2465, vol. 30(18), OSA., US.
Shih-Peng Tai, et al.,"Optical biopsy of fixed human skin with backward-collected optical harmonics signals", Optics Express, Oct. 3, 2005, pp. 8231-8242, vol. 13(20), OSA., US.
Tsung-Han Tsai, et al., "Optical signal degradation study in fixed human skin using confocal microscopy and higher-harmonic optical microscopy", Optics Express, Jan. 23, 2006, pp. 749-758, vol. 14(2), OSA., US.
Shih-Peng Tai, et al., "In vivo optical biopsy of hamster oral cavity with epi-third-harmonic-generation microscopy", Optics Express, Jun. 26, 2006, pp. 6178-6187, vol. 14(13), OSA., US.

* cited by examiner

VIRTUAL SPATIAL OVERLAP MODULATION MICROSCOPY FOR RESOLUTION IMPROVEMENT

FIELD

The subject matter herein generally relates to imaging processing.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to technology simulating the effect of optical microscopy especially nonlinear optical microscopy such as spatial overlap modulation microscopy (SPOM) by software, virtual SPOM (vSPOM). vSPOM that can be combined with nonlinear microsocopy to obtain a superresolution image. Applications include, but are not limited to, real-time in vivo applications.

Figure 1:
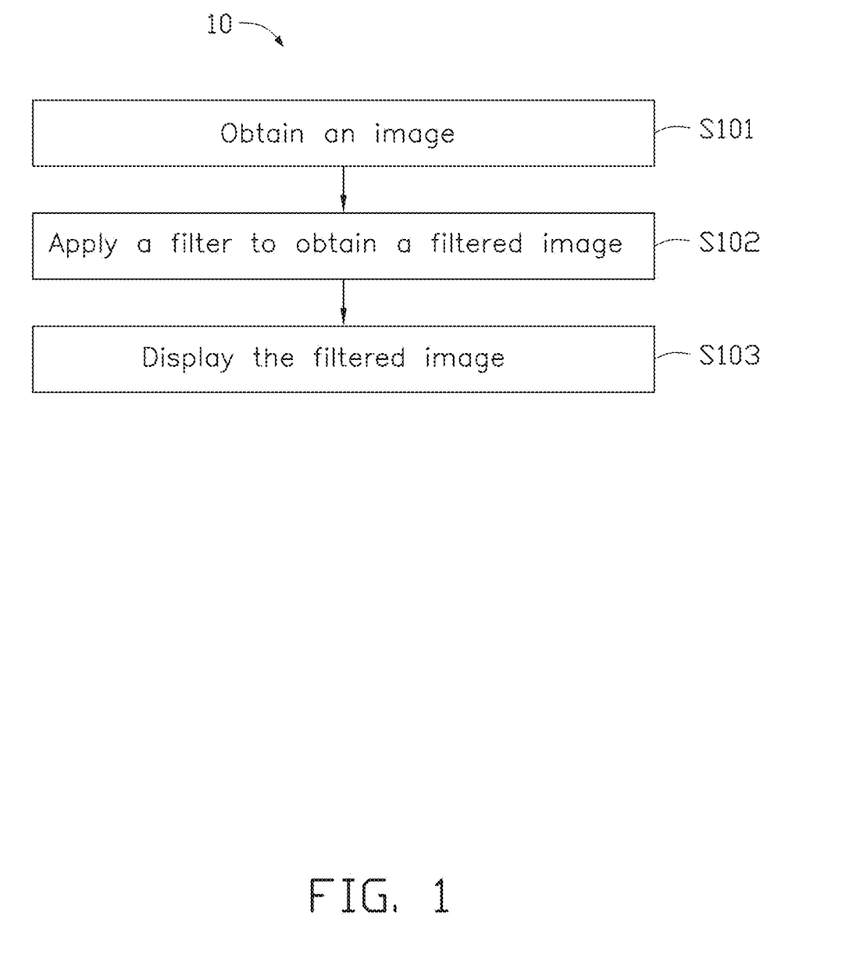
FIG. 1 is an embodiment of a method to obtain and display a filtered image.

Referring to FIG. 1, a flowchart is presented in accordance with an example embodiment. The example method 10 is provided by way of example, as there are a variety of ways to carry out the method. The method 10 described below can be carried out using the configurations illustrated in FIG. 1, for example, and various elements of these figures are referenced in explaining example method 10. Each block shown in FIG. 1 represents one or more processes, methods or subroutines, carried out in the example method 10. Furthermore, the illustrated order of blocks is illustrative only and the order of the blocks can change according to the present disclosure. Additional blocks can be added or fewer blocks may be utilized, without departing from this disclosure. The example method 10 can begin at block S102. An embodiment of a method comprises obtaining an image, applying an image filter to obtain a filtered image, and displaying the filtered image. The image comprises an oversampled image. The image filter can be a Gabor filter, a cosine filter, a laplacian of Gaussian (LoG) filter, a radial filter or any other image filter for simulating effect of optical microscopy. In S101 an imaged is obtained. The obtained image comprises an oversampled image that can be obtained by nonlinear microscopy. Once the image is obtained, in S102 an image filter is applied to the image. These filters can be selected from a bank of filters that comprises one or more of the following filters: Gabor filter, a cosine filter, a LoG filter, a radial filter and other filters causing the image to have characteristics of a specific type of optical microscopy. These filters can be applied via a software applications and/or hardware modules that are able to process the oversampled image and apply the image filter. In S103, the filtered image can be displayed to a user. The display can be any visual display, such as a video monitor. In some embodiments, S101 comprises taking an oversampled image by non-linear microscopy.

Oversampling can be adjusted according to need. Increasing oversampling incurs less discretization error in convolution, but it may result in more time required and a decrease in the frame rate. While decreasing oversampling obtains higher frame rate at the expense of more discretization error. In some embodiments the sampling is at 16 times the theoretical diffraction limit. In other embodiments, the sampling is less than 16 times the theoretical diffraction limit. In other embodiments, the sampling is more than 16 times the theoretical diffraction limit.

The images can be obtained by techniques similar to those used in SPOM, which can comprise spatially modulating beams around a sample and demodulating the received signal with harmonics of modulation frequency to form an image. During SPOM a beam scans back and forth to cover each pixel and takes each sample multiple times; however, vSPOM does not require the back and forth scanning. In vSPOM, the image is oversampled. Oversampling includes, but is not limited to, sampling so densely that the inter-pixel distance is smaller than the system diffraction limit.

In conventional double-beam SPOM, a combination of double-beam pulses is used to trigger nonlinear optical processes. At each image pixel, there is one beam fixed at the center of the pixel, and the other beam scanned upon it at a modulation frequency f. Their overlap volume will be modulated by f, which causes the signal from each side of the pixel to be periodic with T=1/f, because the scanning beam reaches it once in a period. The signal from the central point of pixel is modulated by 2f=2/T because the scanning beam passes it twice in a period. In addition, the signal is mainly composed of even multiples of f's harmonics, among which 2f component is the strongest. As a result, SPOM demodulates only the 2f component in order to extract information from the central point beyond diffraction limit. SPOM can improve the resolution above the diffraction limit by a factor of 1.6

The resolution mechanism of the technique is differential imaging. In fact, spatial modulation is another form of differential imaging. Differential imaging has demonstrated improved resolution and contrast in many studies. The classic differential interference contrast (DIC) microscopy shears the beams in two and re-combines them, thus producing an image proportional to the first derivative of optical path length along shear direction. Optical coherence tomography (OCT) and differential phase contrast OCT (DPCOCT) have similar principles. On the contrary, the principle of differential imaging applies to TPEF microscopy by using the techniques of adaptive optics. Enhanced contrast and resolution are achieved by subtracting the noise background from original image. One can enhance resolution by either taking derivative, as in DIC or DPCOCT, or subtraction, as in adaptive optics.

However there are some drawbacks to SPOM images. SPOM images suffer from low temporal resolution and high laser 1/f noise due to low modulation frequency ~1 kHz, which limits the use of SPOM in the area of in vivo imaging. It takes a relatively long time to acquire an image, and in areas where real-time feedback is required, SPOM is not suited to be employed. The optimal SPOM displacement causes the signal strength to be one eighth that of conventional microscopy. Because increased displacement causes resolution to decay, signal loss cannot be improved by increasing displacement. The using SPOM is challenging in single-beam microscopy systems, as beam splitting and re-combination are necessary.

Multiple basic limits exist for SPOM's resolution improvement at this time, including the limits on spatial frequency and the tradeoff between signal-to-noise ratio (SNR) and resolution. The highest spatial frequency currently attainable is limited by the distance between adjacent pixels, a parameter determined by the hardware's data acquisition procedure. A small derivative mask may render high spatial resolution, but it will tend to enhance noise and deteriorate SNR.

Figure 2:
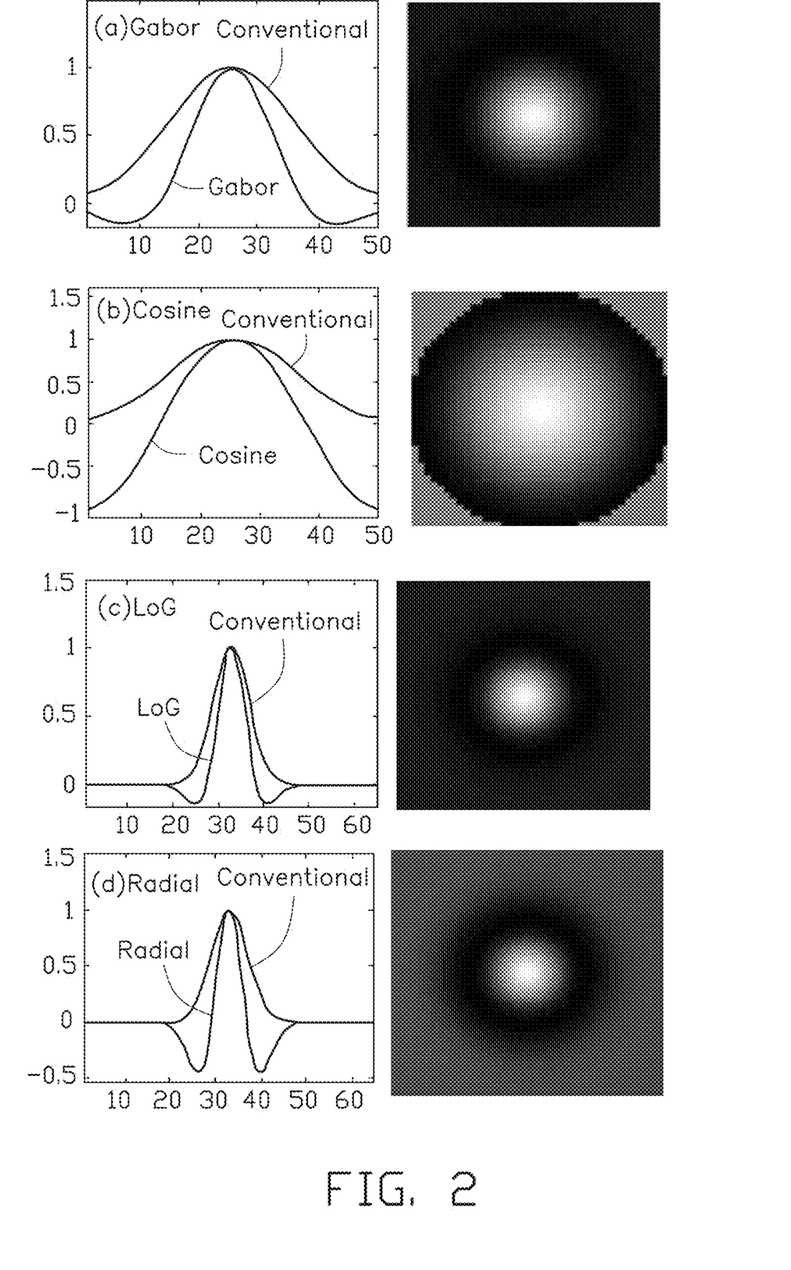
FIG. 2 is shows comparisons of filtered and no filtered samples and a visual of the filtered image.

FIG. 2 illustrates some of the image filters that can be in an image filter bank and the line profiles thereof. All the results shown in FIG. 2 are normalized to set their maximum to unity. The vertical axes have arbitrary unit, and the unit of a pixel is represented by the horizontal axes. The Gabor filter simulates demodulation at 2f for double Gaussian beam. The cosine filter simulates demodulation at 2f for a single beam. The LoG filter shows 2nd derivative in x and y. The effect of the radial filter is shown. The line profiles of every filter, except the intrinsically 2D LoG filter, is rotated and interpolated to make them isotropic. In contrast, it is relatively difficult to make conventional SPOM isotropic, because SPOM only occurs in the direction of physical modulation. Even though 2D SPOM has implemented 2D by modulating the beam separately in x and y directions, there is no isotropic beam modulation. However with vSPOM, isotropic modulation is achieved by post-processing.

The Gabor filter is based on reformulated theory of SPOM. Assuming a double beam with consideration to the spatial modulation effect, the product of Gaussian and cosine function results in a Gabor filter in 1D. In order to the Gabor Filter to a 2D image, the 1D Gabor filter is rotated and interpolated to obtain 2D Gabor filter.

Like the Gabor filter, the cosine filter is based on a reformulated theory of SPOM. Assuming a single beam, the fixed beam effect can be ignored and the cosine filter can be used alone. To apply the cosine filter to 2D images, the 2D cosine filter is obtained by rotation and interpolation.

The LoG filter is a derivative filter.

The radial filter is also known as the radial derivative of Gaussian. To apply the radial filter to 2D images, the 2D cosine filter is obtained by rotation and interpolation.

Since the LoG and the radial filters are based on the small-displacement approximation of demodulation processes, they can simulate the operation of single or double beam systems.

Figure 3:
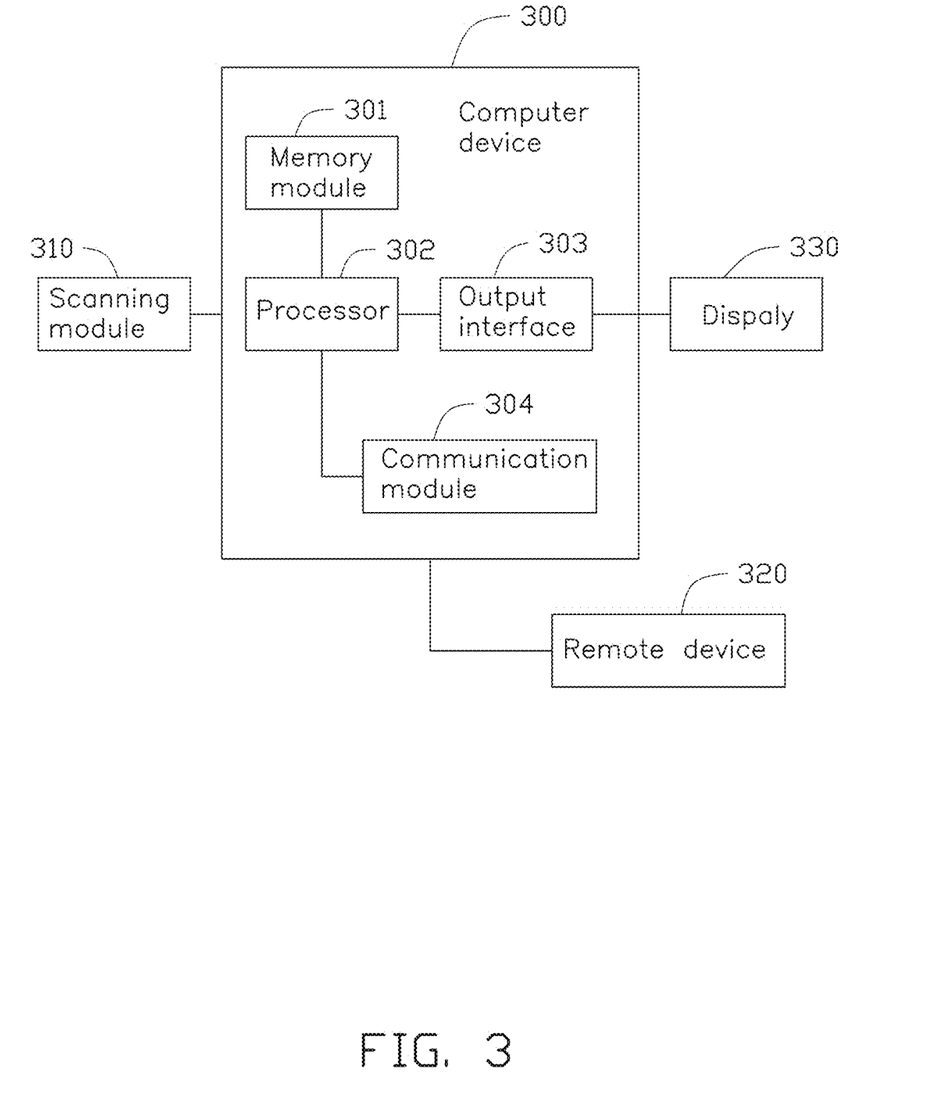
FIG. 3 is an embodiment of a device used to obtain and display an image.

FIG. 3 illustrates an embodiment of a vSPOM system that applies simulated optical effects. A high-resolution image is generated by applying vSPOM system to an object. The high-resolution image is presented on a display 330 and/or communicated to a remote device 320. In some embodiments, the images are sent to a storage. A scanning module 310 is used to obtain an oversampled image from an object by a scanning process. In some embodiments, the image is obtained by non-linear optical microscopy. In some embodiments, single beam nonlinear optical microscopy. The information at each location is taken just once for each cycle. The vSPOM system can include a non-transitory computer readable medium having computer readable program code embodied therein. The non-transitory computer readable medium can comprise a computer readable program code configured to cause a computer system to receive an oversampled image; select an image filter; and apply the image filter to the image.

The computer device 300 comprises a processor 302 and memory module 301 that process images to simulate SPOM images. The computer device 300 further comprises an output interface 303 that can output the filtered image. The processed image can be presented on a display or stored or transferred to a remote device 320 by communication module 304. In some embodiments, the computer device 300 can be a computer module that is in communication with the scanning module 310.

Figure 4:
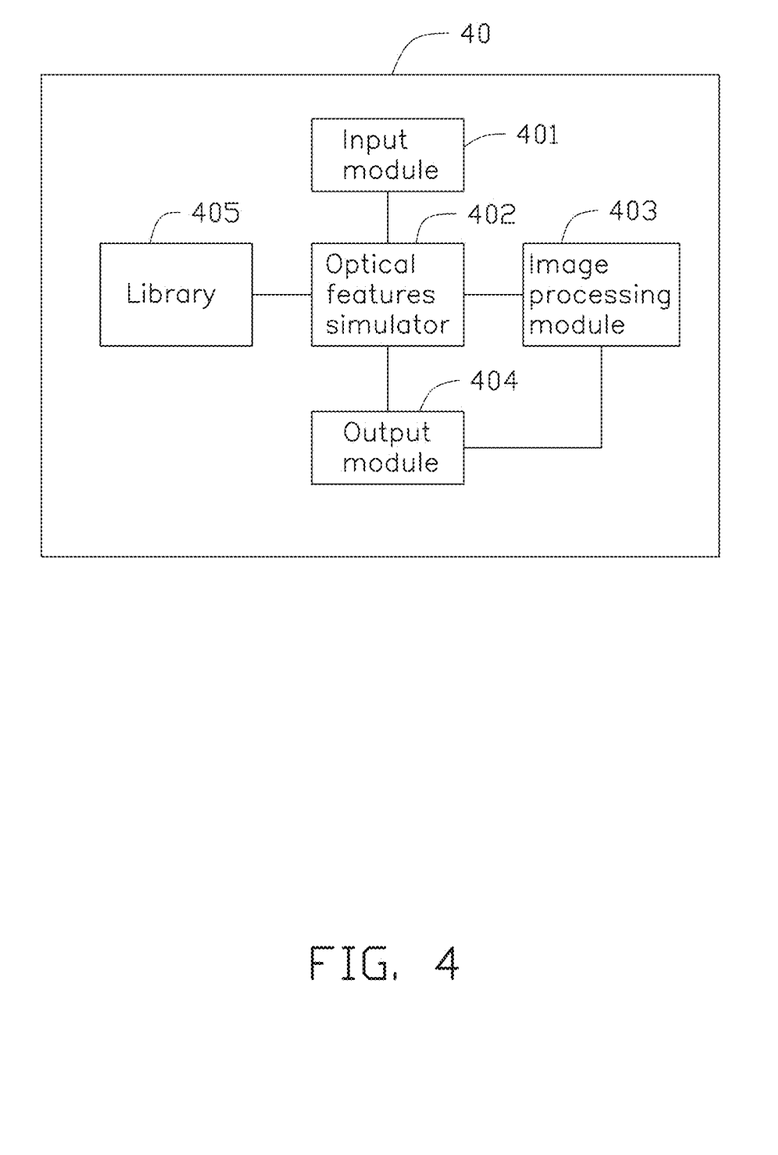
FIG. 4 is an embodiment of a system

FIG. 4 illustrates an embodiment of a software system 40 of vSPOM that comprises an input module 401, an optical features simulator 402, an image processing module 403, and an output module 404. The specific filters, located in a library 405, are applied to simulate optical features according to input data. As an example, demodultation in SPOM can be simulated by a cosine function, and the double-beam effect of SPOM can be simulated by a Gaussian function. Therefore, an image filter combining cosine and Gaussan function can be used. By rotation and interpolation of the filter, the combination can be applied to a 2D image. The optical features simulator 402 selects the image filter from the one or more filters in the library and configures the image filter. An image processing module 403 executes the image filter and outputs the filtered image. The image can be similar to an image obtained by SPOM of the same object.

Figure 5:
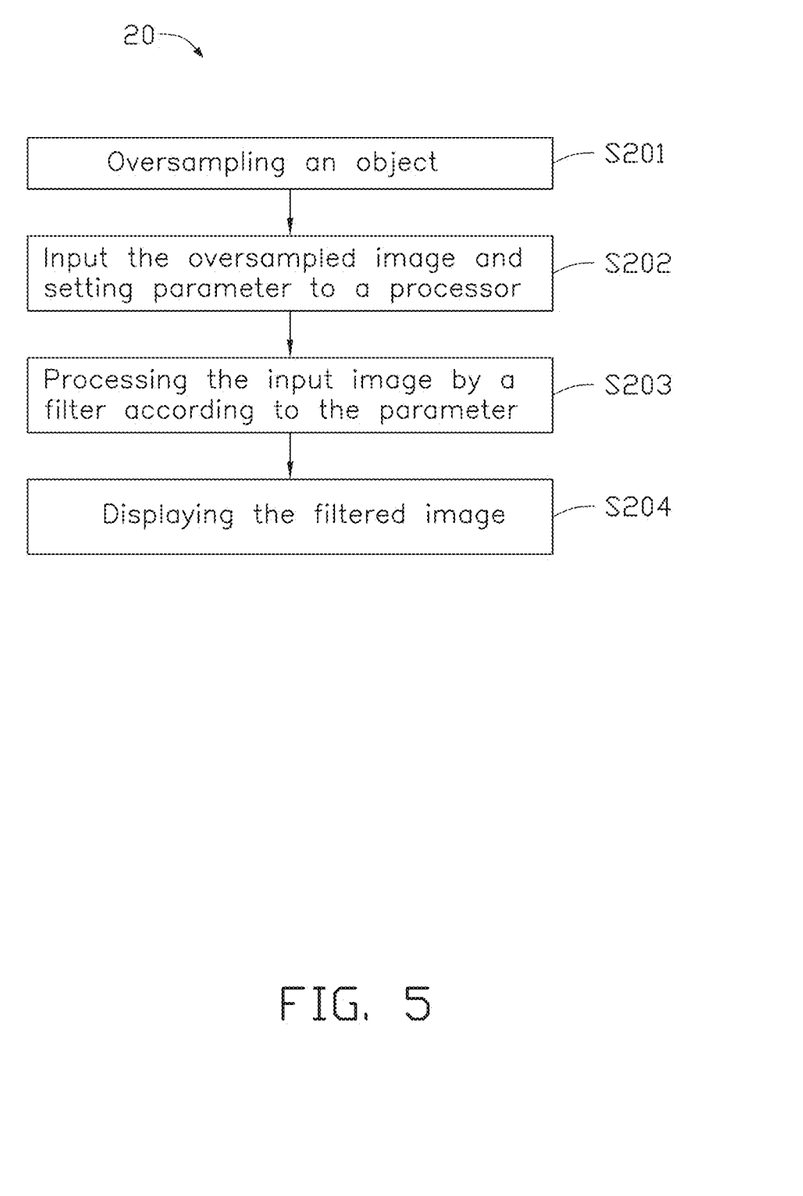
FIG. 5 is an embodiment of a method to obtain and display a filtered image

Referring to FIG. 5, a flowchart is presented in accordance with an example embodiment. The example method 20 is provided by way of example, as there are a variety of ways to carry out the method. The method 20 described below can be carried out using the configurations illustrated in FIG. 5, for example, and various elements of these figures are referenced in explaining example method 20. Each block shown in FIG. 5 represents one or more processes, methods or subroutines, carried out in the example method 30. Furthermore, the illustrated order of blocks is illustrative only and the order of the blocks can change according to the present disclosure. Additional blocks can be added or fewer blocks may be utilized, without departing from this disclosure. The example method 20 can begin at block 5202. FIG. 5 illustrates an embodiment of a method of the vSPOM system. In 5201 an object is oversampled. In some embodiments, oversampling the object 5201 comprises using a scanning apparatus. In some embodiments, the microscopy is used to scan the object. In 5202 the oversampled image is inputted and a parameter used by the processor is set. The processor can build an image filter according to the parameter. In 5203, the image is processed by the filter to obtain a filtered image. In some embodiments the filtered image will have a result that is similar to a SPOM image. In 5204, the filtered image is displayed. In some embodiments, the image is stored on a physical medium and/or device, local and/or remote.

Figure 6:
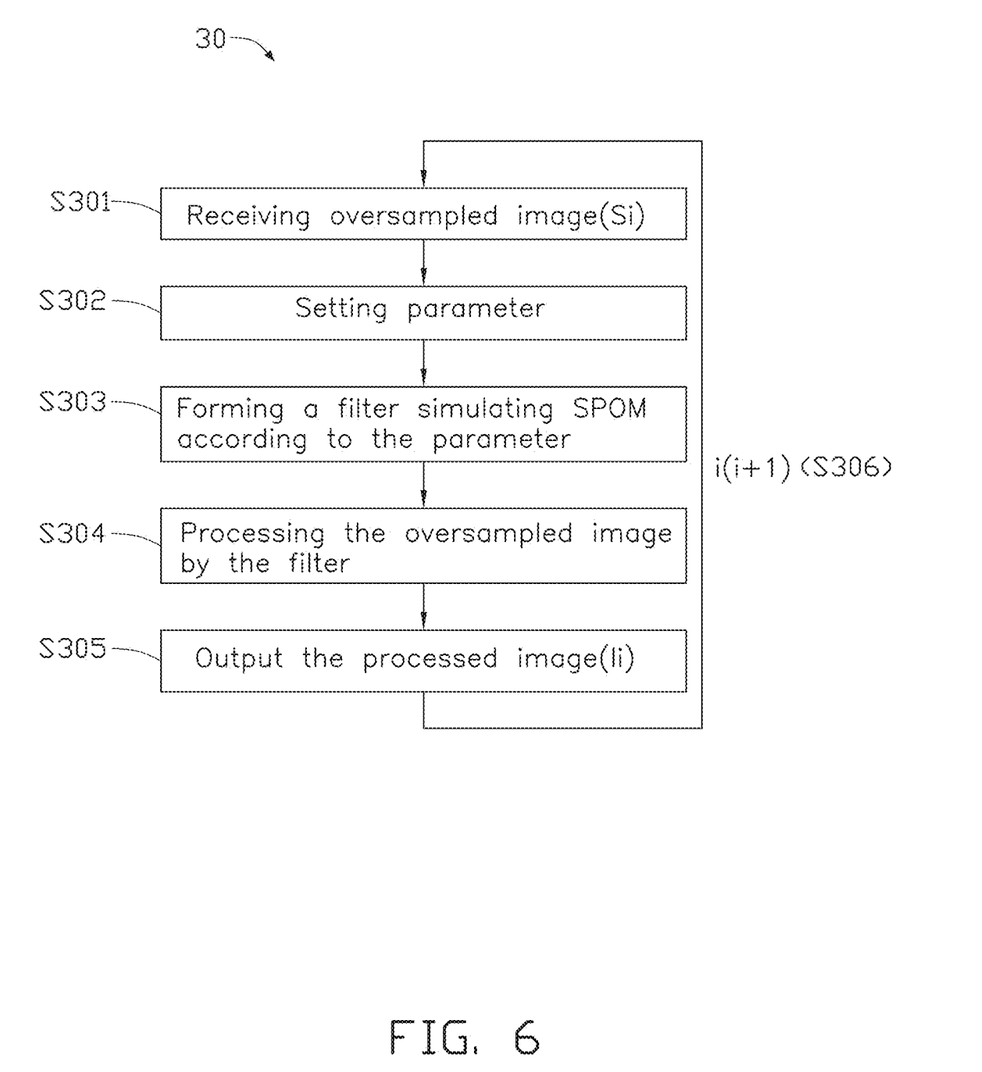
FIG. 6 is an embodiment of a method to produce an image.

Referring to FIG. 6, a flowchart is presented in accordance with an example embodiment. The example method 30 is provided by way of example, as there are a variety of ways to carry out the method. The method 30 described below can be carried out using the configurations illustrated in FIG. 6, for example, and various elements of these figures are referenced in explaining example method 30. Each block shown in FIG. 3 represents one or more processes, methods or subroutines, carried out in the example method 30. Furthermore, the illustrated order of blocks is illustrative only and the order of the blocks can change according to the present disclosure. Additional blocks can be added or fewer blocks may be utilized, without departing from this disclosure. The example method 30 can begin at block S302. FIG. 6 illustrates an embodiment of a method for the processing of an oversampled image. In S301, an oversampled image is received ($S_i$), In S302, one or more parameters are set. In S303, an image filter is selected according to the one or more parameters set in S302. In S304, the oversampled image is processed by the image filter selected in S303. In S305 the filtered image (I) is outputted. In S306, the process repeated according to i(i+1). When the output is displayed on a video screen, it can be updated continuously resulting in a video that is similar to a real-time dynamic scanning video. In some embodiments, the video is displayed at about 1 frame per second. The computer system will account for the path in which the scan was taken as track data and aggregate the images according to the track data. In some embodiments, this is done by a region track module that comprises of hardware and/or software for keeping track of the regions sampled.

It is to be understood that two parameters are important to the design of all vSPOM filters. The first being the scale. The scale of filters refers to the value of standard deviation of Gaussian or the period of cosine/Gabor function. This parameter determines the resolution of final image. The second is the mask. The size of mask is critical to the completeness of filters. Once the mask is large enough, any increase in the size of the mask has little significance. One additional parameter, important to the design of Gabor filter, is the modulation scale. The modulation scale refers to the Gaussian envelope size that tunes Gabor filter's similarity to Gaussian or cosine function. The choice of scale is intended to keep the main lobe intact and partially suppress the sidelobes; thus making Gabor filter a halfway between Gaussian filter and cosine filter.

Figure 7:
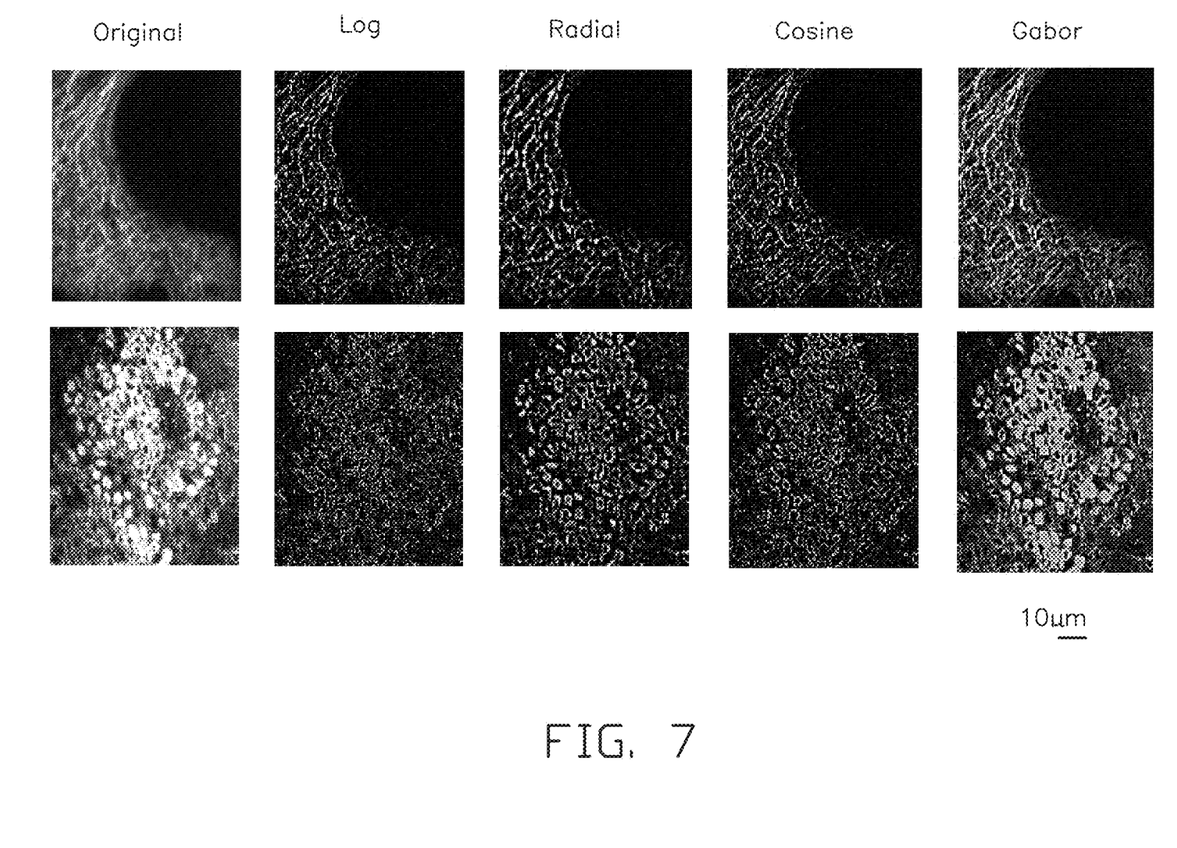
FIG. 7 is a comparison of a sample images and applied filters.

FIG. 7 illustrates examples of in vivo use of vSPOM. As a post-processing technique, vSPOM is much easier to implement than deconvolution because it does not involve the estimation of noise model and system point spread function (PSF). In particular, vSPOM is especially useful for the applications of in vivo Second-Harmonic Generation (SHG) and Third Harmonic Generation (THG) microscopy, which forms image not by the convolution of PSF and object, but by the integral of nonlinear coherent interaction upon the focal volume. As can been seen in the FIG. 7, vSPOM is applied to an SHG image (the original is the top left) and a THG image (the original is on the bottom left). In the second column, the LoG filter is applied to each. In the third column, the radial filter is applied. In the fourth column, the cosine filter is applied. In the fifth column, the Gabor filter is applied. The vSPOM enhances the images while suppressing the noise. The vSPOM enables easy incorporation of SPOM into any imaging system and extends the use of SPOM to real-time in vivo applications.

While SPOM uses modulation techniques to obtain a high-resolution image by implementing differential imaging using hardware, vSPOM provides the ability to obtain a high-resolution images, similar quality to SPOM, by applying software to simulate SPOM result. This technique can be applied in real-time in vivo application or 3D super resolution imaging.

3D vSPOM works in very similar fashion as 2D vSPOM. Just as the 2D vSPOM filters are constructed by making 1D filter circularly symmetric, 3D vSPOM filters are created by making 1D filter spherically symmetric. The image oversampling scheme in z-direction would be the same as in x- and y-directions. The oversampled image can be combined with the 3D filter kernels to yield a 3D vSPOM output images. In the z-direction, the oversampling rate is limited by imaging system step size, thus on can elongate the filter kernel along the z-direction to account for the difference in oversampling rates. In some embodiments a plurality of 2D images are obtained. Then the filtered images are aggregated to generate a 3D images, including the filtered images ordered in one dimension of the 3D image.

Example 1

An experiment was conducted experiment to verify the resolution improvement of vSPOM. The imaging system in use is the three-channel TPEF/SHG/THG microscope. A 1230 nm femtosecond Cr:F-based laser was used to excite TPEF, SHG and THG signals simultaneously.

To measure resolution, fluorescent microspheres (F8806 Life Technologies. Inc.) 200 nm in diameter with absorption/emission wavelength at 625/645 nm were used. Agarose powder (FOCUSBIO) was mixed with pure water to form 1% agarose gel solution. Then the fluorescent microspheres were added into the gel to make a 20-ppm solution. The solution was then put on the cavity of a clean concave slide and sealed the cover class with commercial sealants (FM48001 Matsunami Glass Ind. Ltd.).

In this resolution experiment, the field of view (FOV) is 120×120 µm. The average excitation power at 1230 nm was 40 mW, and the PMT voltage was 1000V. The TPEF signal of the fluorescent microsphere was excited, and the 645 nm red light was detected. In order to study the effect of vSPOM, a heavily oversampled image size of 4096×4096 at a frame rate of 1 fps, with a pixel width of 0.029 µm, much smaller than the fluorescent microsphere size 0.2 µm and the TPEF lateral resolution of 0.5 µm, was taken. The original data has a 14-bit dynamic range determined by our Thorlabs data acquisition system. It was averaged 20 frames to further improve SNR, because the photo-bleaching effect was not apparent on the system used over the image acquisition time. The average image was then processed by the following process.

First, the image median was subtracted as background noise, and the image was smoothed with a small mask Gaussian LPF to remove the shot noises typical in TPEF images.

The LPF standard deviation was set to be half the physical fluorescent microsphere size as a balance between denoising capability and unbiased fluorescent microsphere size. Second, an unbiased Otsu's 2-class threshold was used to segment the potential fluorescent microsphere area. For every image, it has one and only one Otsu threshold that maximizes the ratio of between group variance and within group variance. Third, the area was dilated because it is desired to have each connected component (CC) fully cover the fluorescent microsphere. Fourth, for each CC two descriptors, area and compactness, were evaluated. Compactness is defined as the ratio between the square of perimeter and area, which has the minimum of four in case of circles. Any CC with a large enough area and small enough compactness will remain in the pool. Fifth, vSPOM was applied on the original image and AND it with the collective CCs in the pool. The AND operation extracts the fluorescent microsphere region from background. Within each CC, the threshold is at half the maximum pixel value of that CC to obtain another smaller CC. Observing that the small CCs will be approximately circular, the equivalent radius was calculated and a histogram for all the small CCs' equivalent radii was plotted.

The resolution of TPEF system can be determined that the full-width-at-half-maximum (FWHM) of the system point spread function (PSF) can be used as the system resolution. By image formation theory, the TPEF image is the convolution of system PSF and the actual response function of fluorescent microspheres. The fluorescent signals from microsphere center are stronger than those from the edges because the central part is thicker. This thickness profile leads to approximate the microsphere fluorescence profile by a 2D function, whose FWHM is the radius of original microsphere. The microsphere image is deconvolved with the microsphere fluorescence profile to obtain the system PSF. By Sparrow's criterion, the system resolution can be derived from the FWHM of this PSF.

Figure 8:
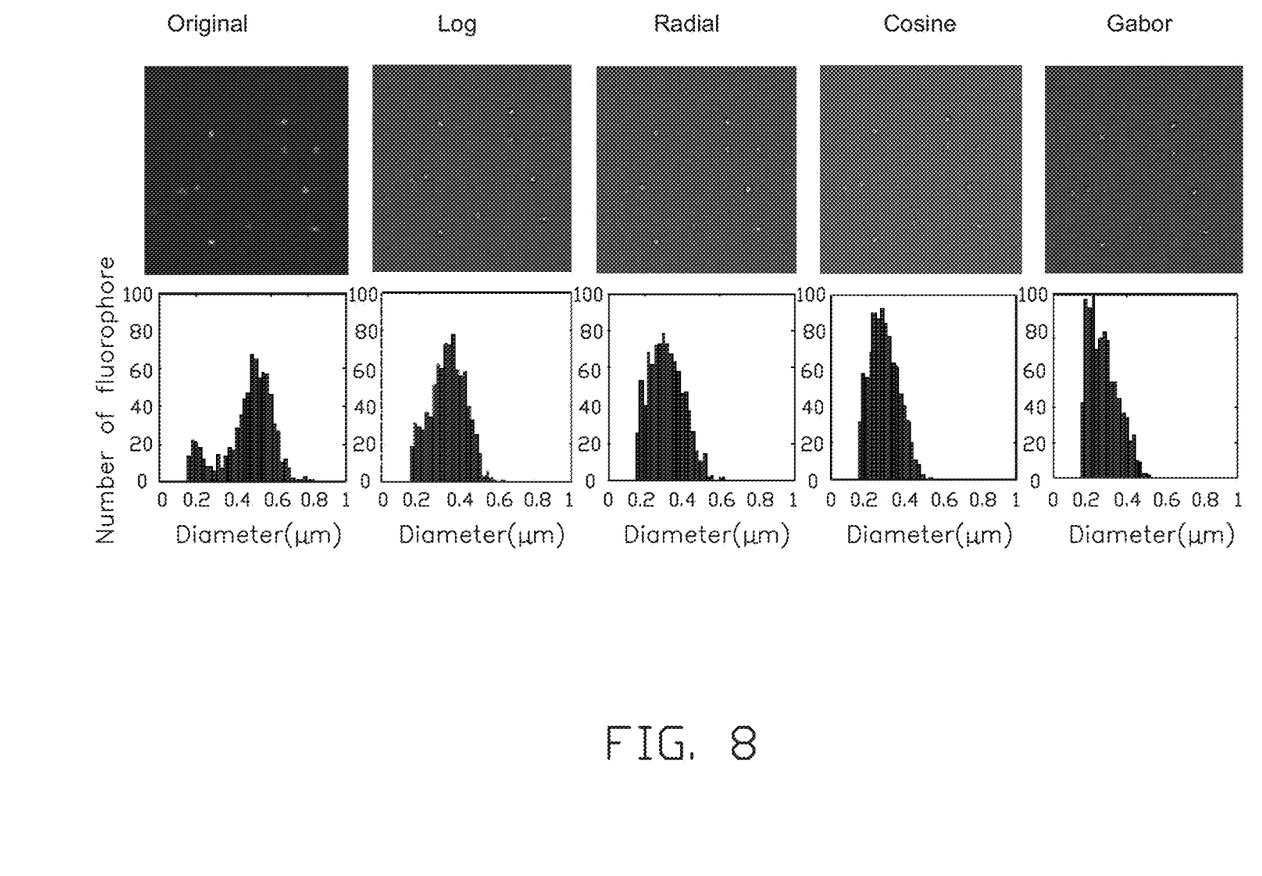
FIG. 8 is a comparison of diameter measurements comparison of a sample image, applied images and histograms of the images.

As can be seen in FIG. 8, all vSPOM filters shift the distribution to the left on a histogram. The average resolution of vSPOM images is better than that of original images by a factor of 1.62, very close to the value 1.63 of some SPOM images. The distribution of diameter approximately follows normal distribution, meaning that the process does not distort the original distribution. This experiment demonstrates that vSPOM can enhance optical image resolution by the same factor as the conventional SPOM. A natural consequence of improved resolution is that finer details than before can be resolved.

Example 2

A collagen fiber image was taken by a 1230 nm Cr:F-based system. A backward epi-SHG and epi-THG signal was collected to form slightly oversampled 512×512 pixel image with a field of view of 100 μm. The transverse and axial resolutions are approximately 500 nm and 2 μm under an output power of 90 mW. The imaging site was the inside of human volar forearm, where a Z motor was used to change the relative position between the arm and objective. Images at 25 μm below skin surface were obtained, acquiring a frame every 5 μm until both THG and SHG signals disappeared, corresponding to a depth deeper than 300 μm. Image frame rate was 2 fps. In these figures, compared with the original and smoothed image, vSPOM images have widely separated fluorescent microspheres and collagen fibers. This demonstrated the resolution improvement capability of vSPOM beyond the optical resolution limit.

Example 3

The use of vSPOM on in vivo human skin imaging of papillary dermis collagen and epidermis basal cells was performed. In an example demonstrated above, due to oversampling and image average, one image took 20 seconds, which can be considered to be too long for effective in vivo clinical imaging. For clinical imaging, the multiplication rate of oversampling was reduced. The in vivo skin imaging protocol is described in Example 2. As shown in FIG. 7, all vSPOM images significantly enhanced the structures and suppressed the cloudy noise as compared with the original images.

All filters demonstrate similar improvement in resolution, with Gabor and cosine slightly better than LoG and radial. Regarding scale selectivity, the cosine and LoG filters enhance fine structures better than the large structures. The radial filter enhances the large structures better than the fine structures. The Gabor filter enhances structures of all scales well. In terms of noise immunity, all vSPOM filters demonstrate similar performances except the radial filter, which has poorer noise immunity and thus does not enhance fine structures as well as the other filters. The radial filter can be used in larger structure enhancement. Finally, all vSPOM filters are isotropic. radial, cosine and Gabor are created from rotating and interpolating 1D filter profile, thus are isotropic. LoG filter is also isotropic because its math expression in polar coordinate depends on r only.

Embodiments within the scope of the present disclosure may also include tangible and/or non-transitory computer-readable storage devices for carrying or having computer-executable instructions or data structures stored thereon. Devices or a storage medium can be part of the computer device 300, remote device 320, the memory module 301, the library 405, image processing module 403, output module 404, optical features simulator 402, and/or input module. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a communication means such as network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules can include routines, programs, components, data structures, objects, and the functions inherent in the design of special-purpose processors and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The following is a list of reference numerals used in this application.

| Number | Part Name |
| --- | --- |
| 10 | method |
| 20 | method |
| 30 | method |
| 40 | software system |
| 300 | computer device |
| 301 | memory module |
| 302 | processor |
| 303 | output interface |
| 304 | communication module |
| 310 | computer system |
| 320 | remote device |
| 330 | display |
| 401 | input module |
| 402 | optical features simulator |
| 403 | image processing module |
| 404 | output module |
| 405 | library |

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

The invention claimed is:

1. A system for applying simulated optical effects of a scanning process to an image of an object, comprising:
   an input module for obtaining the image;
   an image filter bank including one or more image filters corresponding to a simulated optical effect of scanning process;
   an optical features simulator for selecting at least an image filter from the one or more image filters in the image filter bank and configuring the image filter; and
   an image processing module for applying the image filter to the image to attain a filtered image;
   wherein the scanning process is spatial overlap microscopy.

2. The system according to claim 1, wherein the image is an oversampled image of the object.

3. The system according to claim 1, wherein the scanning process is non linear optical microscopy, and the image filter is selected from a group consisting of a Gabor filter, a cosine filter, a laplacian of Gaussian filter, and a radial filter.

4. The system according to claim 1, wherein the image filter is isotropic.

5. The system according to claim 1, wherein the optical features simulator further configures the image filter by setting parameters selected from a group consisting of a scale of the image filter, a mask of the image filter, or the scale of the image filter and the mask of the image filter.

6. The system according to claim 1, wherein the input module repeatedly obtains images of the object in a plurality of time slots respectively, and the image processing module repeatedly applies the image filter to the obtained images to attain filtered images.

7. The system according to claim 6, further comprising an output module for generating a video comprising the filtered images as frames of the video.

8. The system according to claim 6, wherein the input module further receives track data of scanned regions during the scanning process, and the system further comprising an output module for aggregating the filtered images according to the track data.

9. The system according to claim 8, wherein the images are 2D images and the output module generates a 3D image by aggregating the filtered images.

10. A method comprising:
    obtaining an image of an object by a first scanning process; and
    applying an image filter corresponding to a simulated optical effect of a second scanning process to the image to attain a filtered image, wherein the second scanning process is spatial overlap microscopy.

11. The method according to claim 10, wherein the image is an oversampled image of the object.

12. The method according to claim 10, wherein the second scanning process is non linear optical microscopy, and the image filter is selected from a group consisting of a Gabor filter, a cosine filter, a laplacian of Gaussian filter, and a radial filter.

13. The method according to claim 10, wherein the image filter is isotropic.

14. The method according to claim 10, further comprising: configuring the image filter by setting parameters selected from a group consisting of a scale of the image filter, a mask of the image filter, or the scale of the image filter and the mask of the image filter.

15. The method according to claim 10, further comprising:
    obtaining a plurality of images of the object in a plurality of time slots respectively; and
    applying the image filter to the plurality of images to attain filtered images.

16. The method according to claim 15, further comprising: generating a video comprising the filtered images as frames of the video.

17. The method according to claim 15, further comprising:
    receiving track data of scanned regions during the first scanning process; and
    aggregating the filtered images according to track data.

18. The method according to claim 17, wherein the plurality of images are 2D images, and the aggregating the filtered images is to generate a 3D images including the filtered images ordered in one dimension of the 3D image.

19. A non-transitory computer readable medium having computer readable program code embodied therein to process an image of an object generated from a first scanning process, the non-transitory computer readable medium comprising the computer readable program code configured to cause a computer system to:

receive the image of the object;
select an image filter corresponding to a simulated optical effect of a second scanning process, wherein the second scanning process is spatial overlap microscopy; and
adjust the image by applying the image filter to the image to obtain a filtered image.

20. The non-transitory computer readable medium of claim 19, wherein the image is an oversampled image of the object.

21. The non-transitory computer readable medium according to claim 19, wherein the second scanning process is non linear optical microscopy, and the image filter is selected from a group consisting of a Gabor filter, a cosine filter, a laplacian of Gaussian filter, and a radial filter.

22. The non-transitory computer readable medium according to claim 19, wherein the image filter is isotropic.

23. The non-transitory computer readable medium according to claim 19, further configured to cause the computer system to:
obtain a plurality of images of the object in a plurality of time slots; and
apply the image filter to the plurality of images to attain filtered images.

24. The non-transitory computer readable medium according to claim 23, further configured to cause the computer system to display the filtered images in intervals with about the same size as the plurality of time slots.

25. The non-transitory computer readable medium according to claim 23, further configured to cause the computer system to
receive track data of scanned regions during the first scanning process; and
aggregating the filtered images to generate a 3D image according to the track data.

26. A scanning apparatus comprising:
a scanning module for capturing images from an object; and
a computer module electrically coupled to the scanning module;
wherein the computer module is configured to receive the images, apply at least an image filter corresponding to a simulated optical effect of a specific scanning process to attain filtered images and output the filtered images, and wherein the specific scanning process corresponding to the image filter is spatial overlap microscopy.

27. The scanning apparatus according to claim 26, wherein the scanning module captures oversampled images of the object.

28. The scanning apparatus according to claim 26, wherein the specific scanning process corresponding to the image filter is non linear optical microscopy, and the image filter is selected from a group consisting of a Gabor filter, a cosine filter, a laplacian of Gaussian filter, and a radial filter.

29. The scanning apparatus according to claim 26, wherein the image filter is isotropic.

30. The scanning apparatus according to claim 26, wherein the scanning module is configured to obtain the images of the object in a plurality of time slots respectively and the computer module is configured to generating a video comprising the filtered images as frames of the video.

31. The scanning apparatus according to claim 26, wherein the scanning module is configured to move along a track for obtaining the images of different regions of the object, and the scanning apparatus further comprising:
a region track module for detecting sampled regions of the object; and
wherein the computer module further aggregates the filtered images according to track data to generate a 3D image.

32. The scanning apparatus according to claim 26, further comprising a display for displaying the filtered images.

33. The scanning apparatus according to claim 26, further wherein the computer module comprises a communication means for accessing a network and transmitting the filtered images to at least one computing device in the network.

\* \* \* \* \*